June 3, 1958     P. G. ENDEVELD     2,837,041
MACHINE FOR MANUFACTURING COMPOSITE CONFECTIONERY
Filed March 29, 1955     2 Sheets-Sheet 1
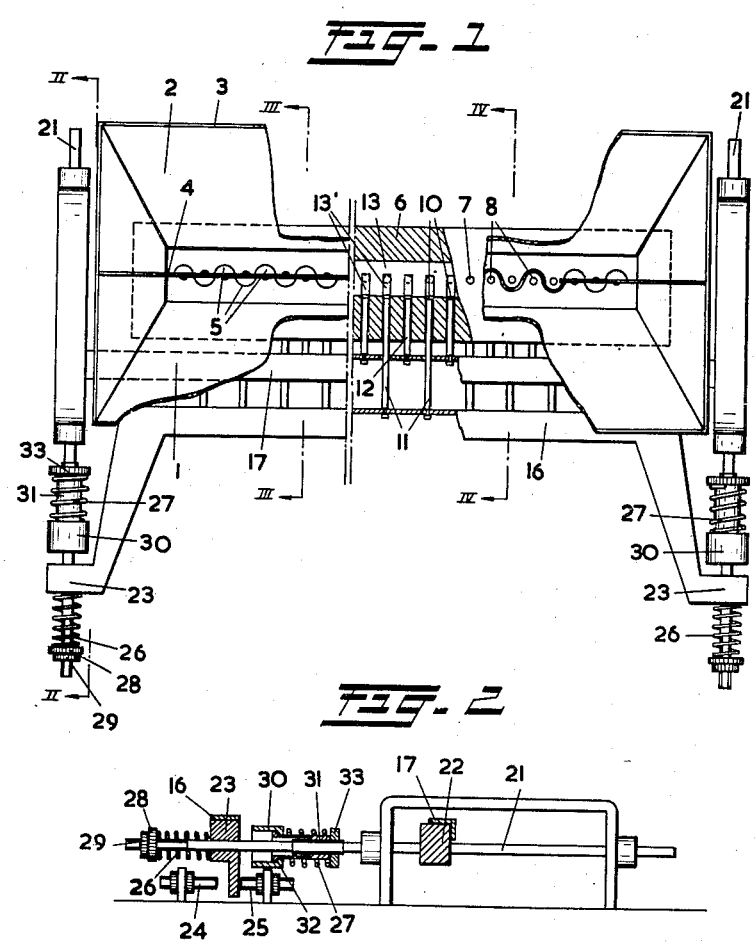

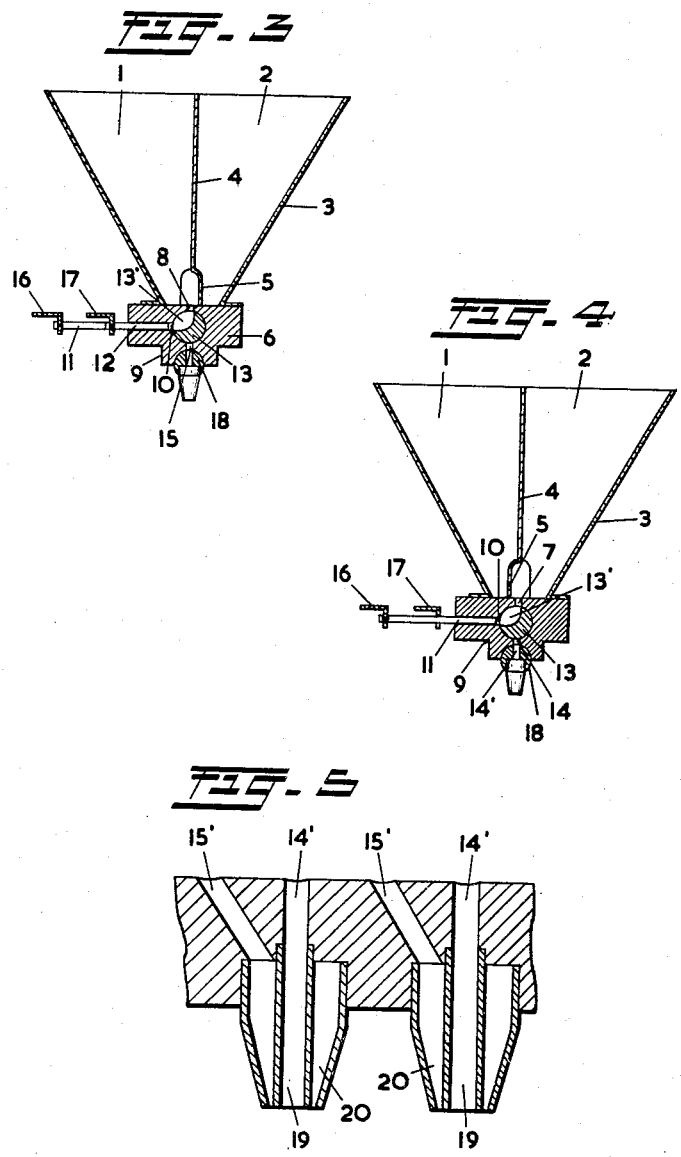

United States Patent Office 2,837,041
Patented June 3, 1958

2,837,041

MACHINE FOR MANUFACTURING COMPOSITE CONFECTIONERY

Pieter Gerrit Endeveld, Vlaardingen, Netherlands, assignor to Vennootschap onder firma "D. O. V. O." Fabriek van Suikerwerken, Schiedam, Netherlands, a corporation of the Netherlands Application March 29, 1955, Serial No. 497,748

Claims priority, application Netherlands April 3, 1954

10 Claims. (Cl. 107—1)

This invention relates to a machine for manufacturing confectionery composed of more than one kind of material.

The object of the invention is to provide such a machine to enable said type of confectionery to be manufactured rationally and efficiently in varied makes, such, for example, as confectionery in which the materials penetrate into one another in a very specific manner or in which one material fully encloses the other material. This last is of particular importance for confectionery having an internal soft core which is to be protected by an external layer of another material in that it is necessary for said layer to fully enclose the core material without any apertures being left. Also a combination is possible for example a core composed of a plurality of materials and provided with a sealing coating.

According to the invention said object is achieved by means of one or a plurality of sets of extruding channels cooperating towards the composition of a piece of confectionery, each of which channels is periodically cut off from or is placed into communication with its own separate piston operated extruding chamber by valve means in alternation with the periodical establishment of a communication between the extruding chamber and a supply reservoir. This renders it possible to periodically suck the various kinds of materials out of their respective supply reservoirs and to jointly extrude them into a mould, the amount of each kind of material fed into the mould depending, of course, on the volumes displaced by the pistons in the extruding chambers, while the composition can be influenced by the arrangement of the extruding nozzles and the shape thereof.

According to the invention a rational embodiment of the machine is obtained if the periodical alternating communication of each extruding chamber with its associated extruding channel and with the relative supply reservoir respectively is established by one and the same valve means which, if desired, may be constructed as a single body for controlling various sets of extruding channels. The valve means may then be, for example, in the form of a shaft provided with suitable transverse grooves and mounted for rotation in a casing provided with said channels and with a continuous opening with which said channels communicate.

According to the invention the inlets of the connecting ducts of the extruding chambers are accommodated with the supply reservoirs in one single member, said ducts alternately ending in the one or in the other supply reservoir.

If with a machine thus fitted up only two kinds of material are worked up a suitable embodiment is obtained according to the invention if the connecting ducts between the extruding chambers and the supply reservoirs have their inlets arranged in a single row, said inlets being separated from one another by the corrugated edge of a partition plate provided between the two supply reservoirs in such a manner that the inlets alternately end in the one or in the other supply reservoir.

In order that in the final product one of the materials may enclose the other material or materials the machine according to the invention is characterized in that at least two extruding channels feed to a set of nozzles, wherein one nozzle surrounds another nozzle. In order that the coating of the one material enclosing the other material or materials may be complete without hiatuses, the extruding stroke of the piston belonging to the extruding nozzle, that surrounds the other extruding nozzle, starts sooner and ends later than the extruding stroke of the piston belonging to said other nozzle.

In order to be able to obtain a great many effects in the final product the machine can generally be so constructed that the extruding stroke of one or more of the pistons belonging to a set of extruding channels starts and/or ends at another point of time than the extruding stroke of the other piston or pistons belonging to said set.

Preferably the machine is so constructed that the pistons that correspond in respect of the sets of extruding channels are jointly reciprocated by a common actuating member, while furthermore the machine is rendered very suitable for various purposes in that according to the invention two or more actuating members being coupled with one or a plurality of reciprocatory operating members, the coupling of at least one of said actuating members being effected through the agency of one or a plurality of spring means enabling the stroke of the actuating members to be adjusted relatively to one another by means of one or a plurality of fixed or adjustable stops.

An important property of the machine according to the invention is its suitability to be so fitted up that the operation according to the application can be carried out therewith, which operation is characterized in that the operative extruding strokes of the extruding pistons forcing the materials through the extruding nozzles either surrounding each other or not, begin and end at different points of time.

The invention which lends itself to be applied in various manners will now be elucidated with reference to a single embodiment of a machine for working up two kinds of materials, one of which is to surround the other. Said embodiment is shown more or less diagrammatically in the drawing in which:

Figure 1 is a plan view of the machine and partly of a section thereof taken at the place where the pistons are located, only the main parts being shown;

Figure 2 is a cross-section on the line II—II in Figure 1.

Figure 3 is a cross-section on the line III—III in Figure 1.

Figure 4 is a cross-section on the line IV—IV in Figure 1 and

Figure 5 is a longitudinal section of the nozzle carrier on a somewhat larger scale.

The supply reservoirs for the two kinds of materials are formed by the two halves 1 and 2 into which the longitudinal hopper 3 is subdivided by a partition wall 4. The lower edge 5 of said wall or plate 4 is corrugated and so positioned on the casing 6 of a valve means 9 controlling the connection to the extruding nozzles, which casing 6 at the same time forms the bottom of the hopper, that the openings of the suction ducts 7, 8 alternately end in the reservoir half 1 or 2. Figure 3 is a section taken adjacent a suction duct ending in the reservoir half 1, Figure 4 showing the section at the place where a suction duct ends in the reservoir half 2.

The casing 6 of the valve means 9 is provided with a series of horizontal bores 10 in which the pistons 11 or 12 for sucking in and extruding the material are located. Said bores or piston chambers communicate with a suction duct 7 and 8 respectively or with an extruding channel 14 or 15 respectively in dependence on the position of the transverse grooves 13' in the rotary valve body or the valve 13. If said bores communicate with the suction ducts the pistons may jointly be moved to the left as seen in the drawing in order to suck in the material, whereupon after the valve has been turned through 90° in counterclockwise direction in order to effect the communication with the extruding channels and to interrupt the communication with the suction ducts they are jointly moved to the right.

Said pistons are alternately connected with the actuating member 16 or with the actuating member 17.

The actuating member 16 starts moving later and stops moving sooner than the member 17, which is effected in a manner to be described hereinafter.

The actuating member 16 is connected with the pistons 11 operating in the extruding chamber which is adapted to be connected to the extruding channels 14, the actuating member 17 is connected with the pistons 12 operating in the extruding chamber adapted to be connected to the extruding channels 15. The extruding channels 14 and 15 respectively merge into the channels 14' and 15' respectively provided in the interchangeable nozzle carrier 18 mounted against the casing 6 of the valve means. The channels 14' (vide Figure 5) end in the central nozzle 19, whereas the channels 15' end in the nozzle 20 surrounding the nozzle 19. The two nozzles are secured in the nozzle carrier by press-fitting, soldering or by means of screw-thread; the channel 14' extends at right angles to the longitudinal direction of the nozzle carrier, the channel 15' makes an oblique angle with said longitudinal direction so as to end in the nozzle 20 and at the same time to link up with the channel 15.

Below the nozzles a set of conventional rubber or powdered moulds are conveyed in a manner not further indicated.

If now the valve 13 is in the position shown in Figures 3 and 4 the outward movement of the pistons results in material being sucked out of the supply reservoirs 1 and 2 and into the extruding chamber. Subsequently the valve 13 is turned through an angle of 90° in counterclockwise direction so that the communication between the extruding chamber and the extruding channels is established, while the communication between the suction ducts and the supply reservoirs is interrupted. By the inward movement of the pistons the material is then extruded through the nozzles into the moulds, the material emerging from the nozzle 20 enclosing like a tube the material emerging from the nozzle 19.

As the actuating member 16 and, therefore, the pistons 11 start moving later than the actuating member 17 and the pistons 12 the tubular material emerging from the nozzles 20 will first reach the bottom of the mould and by contacting said bottom it is forced inwardly to form a closed bottom. As the extrusion from the nozzle 19 also stops sooner the material from the nozzle 20 will subsequently fill the upper space still left in the mould and will also flow together there, so that the core of the article of confectionery is entirely enclosed in the external material.

As appears from Figures 3 and 4 the annular space between the two nozzles grows narrower, so that a sufficient pressure will be generated in the coating material to make it free from openings.

It will be clear that in a similar manner many variations in the final product can be obtained in dependence on the number, the shape and the mutual arrangement of the nozzles and the extruding periods. All these variations, however, are based on the same principle.

The manner in which the actuating members are moved appears from Figures 1 and 2. On either side of the machine the actuating members 16 and 17 each comprising a bar of profile material provided with slots in which the piston rods fit by means of annular grooves are coupled with a reciprocating operating rod 21 slidably mounted in a portion of the frame.

The two rods 21 are connected by driving means not shown, which ensures the uniformity of their movements.

The actuating member 17 is firmly secured to each rod 21 by means of a block 22, so that it moves in unison with said rods.

The actuating member 16, on the other hand, has either end connected to a block 23 adapted to slide over the rod 21. Said block, however, is compelled to follow the movements of the rod 21 by means of the springs 26 or 27 as long as it does not run against the adjustable stop 24 or 25. The spring 26 bears with its one end against the nuts 28, 29 secured on the rod 21. The spring 27 bears with its one end against a sleeve 30 which is provided with an inner collar and which is adapted to slide over a sleeve 31, but which is prevented from sliding off said sleeve 31 owing to the provision on said latter sleeve of the flange 32; the other end of said spring bears against the nut 33 which at the same time serves as a lock nut for securing the sleeve 31, which sleeve and nut are adapted to be adjusted by screwing them over the screwthread provided on the rod 21.

When the rod 21 moves to the left the block 23 which is taken along by the sleeve 30 can follow this movement until it is arrested by the stop 24, the rod can move on then whereby the spring 27 is compressed, which spring keeps the block urged against the stop during the return movement of the rod until the inner collar of the sleeve 30 runs against the flange 32 of the fixed sleeve 31. The spring 26 subsequently sees to it that the movement of the rod 21 is followed by the block 23 until it runs against the stop 25, whereupon the rod can move on, whereby the spring 26 is compressed. After reversal of the movement of the rod the block is taken along again as soon as the sleeve 30 runs against it.

In order that the inner collar of the sleeve 30 will be positively urged against the flange 32 as long as the stop 24 is inoperative the spring 27 is made stronger than the spring 26, the difference in strength being greater than the resistance to suction exerted on the pistons.

Owing to the adjustability of the stops 24, 25 and of the sleeve 31 the length of the stroke of the one actuating member can be more or less shortened relatively to the length of the stroke of the other actuating member, but said strokes may also be so adjusted as to be asymmetrical relative to each other, so that the ratio between the thicknesses of the bottom and top portions of the confectionery can be controlled.

In a similar manner all kinds of extruding ratios can be controlled also in the case of nozzles which, for example, are arranged side by side.

I claim:

1. A machine for manufacturing confectionery products having a core of a first material and an envelope of a second material, said second material completely surrounding and enclosing the core material, said machine comprising a plurality of outer extruding nozzles, each of said outer nozzles surrounding at least one inner extruding nozzle, a plurality of first pumps each having an outlet channel communicating with one of said outer nozzles and each having a suction channel communicating with a source of supply of said second enveloping material, a plurality of second pumps each having an outlet channel communicating with one of said inner nozzles and each having a suction channel communicating with a source of supply of said first material, each of said first and second pumps including a cylinder and a piston axially reciprocatable therein to withdraw material from the source of supply with which the associated suction channel is connected and to advance said material through the associated outlet channel, valve means for selectively establishing and cutting off communication between each pump and its associated suction channel and between each pump and its associated outlet channel in timed relationship with the reciprocating movement of the pump piston, first actuating members for said first pumps and second actuating members for said second pumps, said first and second actuating members being coupled with the pistons of the first and second pumps, respectively, reciprocatory driving means for moving said actuating members, said driving means acting upon said first actuating members to drive said first pistons before acting upon said second actuating members to drive said second pistons and said driving means releasing the second actuating members before releasing the first actuating members during each stroke, force transmitting means adapted to undergo limited relative displacement connecting said driving means and one of said first and said second actuating members to transmit force from said driving means to said one of said first and said second actuating members, and stops for limiting the stroke of said last-named actuating members.

2. A machine for manufacturing confectionery products having a core of a first material and an envelope of a second material, said second material completely surrounding and enclosing the core material, said machine comprising a plurality of outer extruding nozzles, each of said outer nozzles surrounding at least one inner extruding nozzle, a plurality of first pumps each having an outlet channel communicating with one of said outer nozzles and each having a suction channel communicating with a source of supply of said second enveloping material, a plurality of second pumps each having an outlet channel communicating with one of said inner nozzles and each having a suction channel communicating with a source of supply of said first material, each of said first and second pumps including a cylinder and a piston axially reciprocatable therein to withdraw material from the source of supply with which the associated suction channel is connected and to advance said material through the associated outlet channel, valve means for selectively establishing and cutting off communication between each pump and its associated suction channel and between each pump and its associated outlet channel in timed relationship with the reciprocating movement of the pump piston, first actuating members for said first pumps and second actuating members for said second pumps, said first and second actuating members being coupled with the pistons of the first and second pumps, respectively, reciprocatory driving means for moving said actuating members, said driving means acting upon said first actuating members to drive said first pistons before acting upon said second actuating members to drive said second pistons and said driving means releasing the second actuating members before releasing the first actuating members during each stroke, force transmitting means adapted to undergo limited relative displacement connecting said driving means and one of said first and said second actuating members to transmit force from said driving means to said one of said first and said second actuating members, and adjustable stops for limiting the stroke of said last-named actuating members.

3. A machine for manufacturing confectionery products having a core of a first material and an envelope of a second material, said second material completely surrounding and enclosing the core material, said machine comprising a plurality of outer extruding nozzles, each of said outer nozzles surrounding at least one inner extruding nozzle, a plurality of first pumps each having an outlet channel communicating with one of said outer nozzles and each having a suction channel communicating with a source of supply of said second enveloping material, a plurality of second pumps each having an outlet channel communicating with one of said inner nozzles and each having a suction channel communicating with a source of supply of said first material, each of said first and second pumps including a cylinder and a piston axially reciprocatable therein to withdraw material from the source of supply with which the associated suction channel is connected and to advance said material through the associated outlet channel, valve means for selectively establishing and cutting off communication between each pump and its associated suction channel and between each pump and its associated outlet channel in timed relationship with the reciprocating movement of the pump piston, first actuating members for said first pumps and second actuating members for said second pumps, said first and second actuating members being coupled with the pistons of the first and second pumps, respectively, reciprocatory driving means for moving said actuating members, said driving means acting upon said first actuating members to drive said first pistons before acting upon said second actuating members to drive said second pistons and said driving means releasing the second actuating members before releasing the first actuating members during each stroke, force transmitting means adapted to undergo limited relative displacement connecting said driving means and said second actuating members to transmit force from said driving means to said one of said first and said second actuating members, and adjustable stops for limiting the stroke of said second actuating member in relation to said first actuating members.

4. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection.

5. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said regulatable resilient connection comprising a sliding element secured to the first actuating member, said sliding element being freely slidable along the driving rod between two extreme positions defined by two stops, the relative positions of said stops being adjustable for controlling the extrusion period of the first material.

6. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said regulatable resilient connection comprising a sliding element secured to the first actuating member, said sliding element being freely slidable along the driving rod between two extreme positions defined by two stops, the relative positions of said stops being adjustable for controlling the extrusion period of the first material, said driving rod having secured to it a driving member, said driving member having connected thereto an adjustable resilient means between it and the first actuating member adapted to engage said actuating member, said resilient means causing the first actuating member to move with said driving rod until said first actuating member engages one of said stops limiting its movement, whereupon said rod is free to continue displacement of the second actuating member upon further movement without carrying along the first actuating member.

7. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said regulatable resilient connection comprising a sliding element secured to the first actuating member, said sliding element being freely slidable along the driving rod between two extreme positions defined by two stops, the relative positions of said stops being adjustable for controlling the extrusion period of the first material, said two stops being positioned so that the movement of the second actuating member commences prior to and terminates later than the movement of the first actuating member.

8. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said regulatable resilient connection comprising a sliding element secured to the first actuating member, said sliding element being freely slidable along the driving rod between two extreme positions defined by two stops, the relative positions of said stops being adjustable for controlling the extrusion period of the first material, said two stops being positioned so that the movement of the second actuating member commences prior to and terminates simultaneously with the movement of the first actuating member.

9. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said regulatable resilient connection comprising a sliding element secured to the first actuating member, said sliding element being freely slidable along the driving rod between two extreme positions defined by two stops, the relative positions of said stops being adjustable for controlling the extrusion period of the first material, said two stops being positioned so that the movement of the second actuating member commences simultaneously with and terminates simultaneously with the movement of the first actuating member.

10. A machine for manufacturing confectionery products having a core of a first material and an envelope of a second material, said second material completely surrounding and enclosing the core material, said machine comprising a plurality of first extruding nozzles for said first material and a plurality of second extruding nozzles for said second material, a plurality of first pumps each having an outlet channel communicating with one of said first nozzles and each having a suction channel communicating with the source of supply of said first material, said passages being concentric, a plurality of second pumps each having an outlet channel communicating with one of said second nozzles and each having a suction channel communicating with the source of supply of said second material, each of said first and second pumps including a cylinder and a piston axially reciprocatable therein to withdraw the material from the source of supply with which the associated suction channel is connected and to advance said material through the associated outlet channel, all of said first pistons being interconnected to a first actuating member for simultaneous movement, all of said second pistons being connected to a second actuating member for simultaneous movement, and at least one common driving rod to which said actuating members are connected to effect reciprocating movement of said pistons, said second actuating member being rigidly connected to said rod and said first actuating member being connected to said rod by a regulatable resilient connection, said driving rod being double-acting, whereby the pistons first suck material from the sources of supply into the inlet channels, and adjustable means being provided for limiting the displacement of the first actuating member, the adjustment of said means being such that the relative amounts of first and second material withdrawn from the sources of supply correspond with the amounts to be extruded.

References Cited in the file of this patent

UNITED STATES PATENTS

| | | |
|---|---|---|
| 544,962 | Copland | Aug. 20, 1895 |
| 1,711,750 | Schoppner | May 7, 1929 |
| 2,099,252 | Bagby | Nov. 16, 1937 |
| 2,271,767 | Hummel | Feb. 3, 1942 |
| 2,282,313 | Hershey | May 12, 1942 |
| 2,649,744 | Elwell | Aug. 25, 1953 |